US008660850B2

(12) United States Patent
Faisman et al.

(10) Patent No.: US 8,660,850 B2
(45) Date of Patent: Feb. 25, 2014

(54) METHOD FOR THE SEMI-AUTOMATIC EDITING OF TIMED AND ANNOTATED DATA

(75) Inventors: Alexander Faisman, Croton-on-Hudson, NY (US); Grabarnik Genady, Scarsdale, NY (US); Dimitri Kanevsky, Ossining, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 13/371,516

(22) Filed: Feb. 13, 2012

(65) Prior Publication Data
US 2012/0147264 A1 Jun. 14, 2012

Related U.S. Application Data

(62) Division of application No. 11/624,990, filed on Jan. 19, 2007, now Pat. No. 8,140,341.

(51) Int. Cl.
*G10L 21/00* (2013.01)
*G09B 19/04* (2006.01)
*G06F 17/28* (2006.01)

(52) U.S. Cl.
CPC .................................. *G06F 17/289* (2013.01)
USPC ........... 704/277; 434/156; 434/185; 386/239; 386/240; 386/241

(58) Field of Classification Search
CPC ................................................... G06F 17/289
USPC .................... 386/239, 243–245; 725/88, 135; 704/235, 277; 434/156, 185
See application file for complete search history.

(56) References Cited

U.S. PATENT DOCUMENTS

| 5,782,692 | A | 7/1998 | Stelovsky |
| 6,816,468 | B1 | 11/2004 | Cruickshank |
| 7,136,816 | B1 | 11/2006 | Strom |
| 7,539,619 | B1 | 5/2009 | Seligman et al. |
| 7,599,965 | B1 | 10/2009 | Benitez et al. |
| 2004/0098671 | A1 | 5/2004 | Graham et al. |
| 2005/0086702 | A1* | 4/2005 | Cormack et al. .............. 725/135 |
| 2006/0183089 | A1 | 8/2006 | Gleissner et al. |
| 2006/0206526 | A1 | 9/2006 | Sitomer |
| 2007/0011012 | A1* | 1/2007 | Yurick et al. .................. 704/277 |

OTHER PUBLICATIONS

WGBH-NCAM, [online]; [retrieved on Oct. 18, 2011]; retrieved from the Internet http://ncam.wgbh.org/invent_build/web_multimedia/tools-guidelines/magpie WGBH—National Center for Accessible Media; MAGpie Home; Media Access Generator; pp. 1-2; 2009.

(Continued)

*Primary Examiner* — Thai Tran
*Assistant Examiner* — Mishawn Dunn
(74) *Attorney, Agent, or Firm* — Cantor Colburn LLP; Anne Dougherty

(57) ABSTRACT

A method for editing timed and annotated data includes acquiring a multimedia data stream; performing a decoding operation upon the multimedia data stream, wherein the decoded data stream comprises a textual data stream; synchronizing the multimedia data stream and the decoded data stream by performing a time stamping operation upon the data streams; editing the decoded data stream; and realigning the time stamp data of the edited decoded data stream in order to synchronize the edited decoded data with the multimedia data stream.

6 Claims, 3 Drawing Sheets

(56) References Cited

OTHER PUBLICATIONS

W3C Synchronized Multimedia Home Page, [online]; [retrieved on Oct. 18, 2011]; retrieved from the Internet http://www.w3.org/AudioVideo/ W3C Interaction Domain; Synchronized Multimedia; SMIL—Synchronized Multimedia Integration Language; pp. 1-11; 2011.

Sourceforge, [online]; [retrieved on Oct. 18, 2011]; retrieved from the Internet http://sourceforge.net/projects/tae/Geek.net; Text Annotation Environment; pp. 1-3; 2011.

\* cited by examiner

FIG. 3

METHOD FOR THE SEMI-AUTOMATIC EDITING OF TIMED AND ANNOTATED DATA

CROSS-REFERENCE TO RELATED APPLICATION

This application is a divisional of U.S. patent application Ser. No. 11/624,990, filed Jan. 19, 2007, the disclosure of which is incorporated by reference herein in its entirety.

FIELD OF THE INVENTION

This invention relates to audio and visual multimedia processing systems and particularly to methodologies for editing time and annotated multimedia data.

DESCRIPTION OF BACKGROUND

Before our invention there were many situations when it is necessary to create a transcription of a multimedia file, wherein the transcription of the multimedia file was synchronized with the original multimedia file. This situation was particularly relevant in fields pertaining to the transcribing and/or translation of multimedia video data, the maintaining of media databases, and the preparation of caption data for televised programming.

Presently, transcripts of multimedia data are created using either automatic speech recognition (ASR), and/or automatic translation tools. Unfortunately, initial draft transcriptions that have been generated by ASR often have the need to be edited in order to provide the correct textual representation of an original media data stream file. Typically, as a result of the editing process, the time-alignment between various media streams and the edited transcribed/translated text is destroyed. Therefore, there exists a need to provide a cost-effective, standard user-based methodology for the editing of time aligned transcripts, annotations to the time aligned transcripts and translations of the transcripts.

SUMMARY

The shortcomings of the prior art are overcome and additional advantages are provided through the provision of a method for editing timed and annotated data, the method further comprising the steps of acquiring a multimedia stream, segmenting the multimedia stream into a video data and an audio data stream, wherein the playback times of the video and audio data streams are synchronized, associating playback time annotation indicators with the time synchronized video and audio data streams, wherein discrete playback time annotation indicators of the video data stream segments correlate with discrete playback time annotation indicators of the audio data stream segments, and creating a transcript of the audio data stream.

The method further comprises the steps of associating the discrete playback time annotation indicators of the audio data stream words, or phrases that are reproduced within the audio data stream with respective corresponding textual representations of the words, or phrases that are comprised within the transcript, editing the transcript of the audio data stream, and outputting the transcript, the video data and audio data streams in a predetermined data format.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of an HTML formatted output that is displayed within a web browser, wherein the multimedia file and the transcription stream are time-synchronized.

Figure 1:
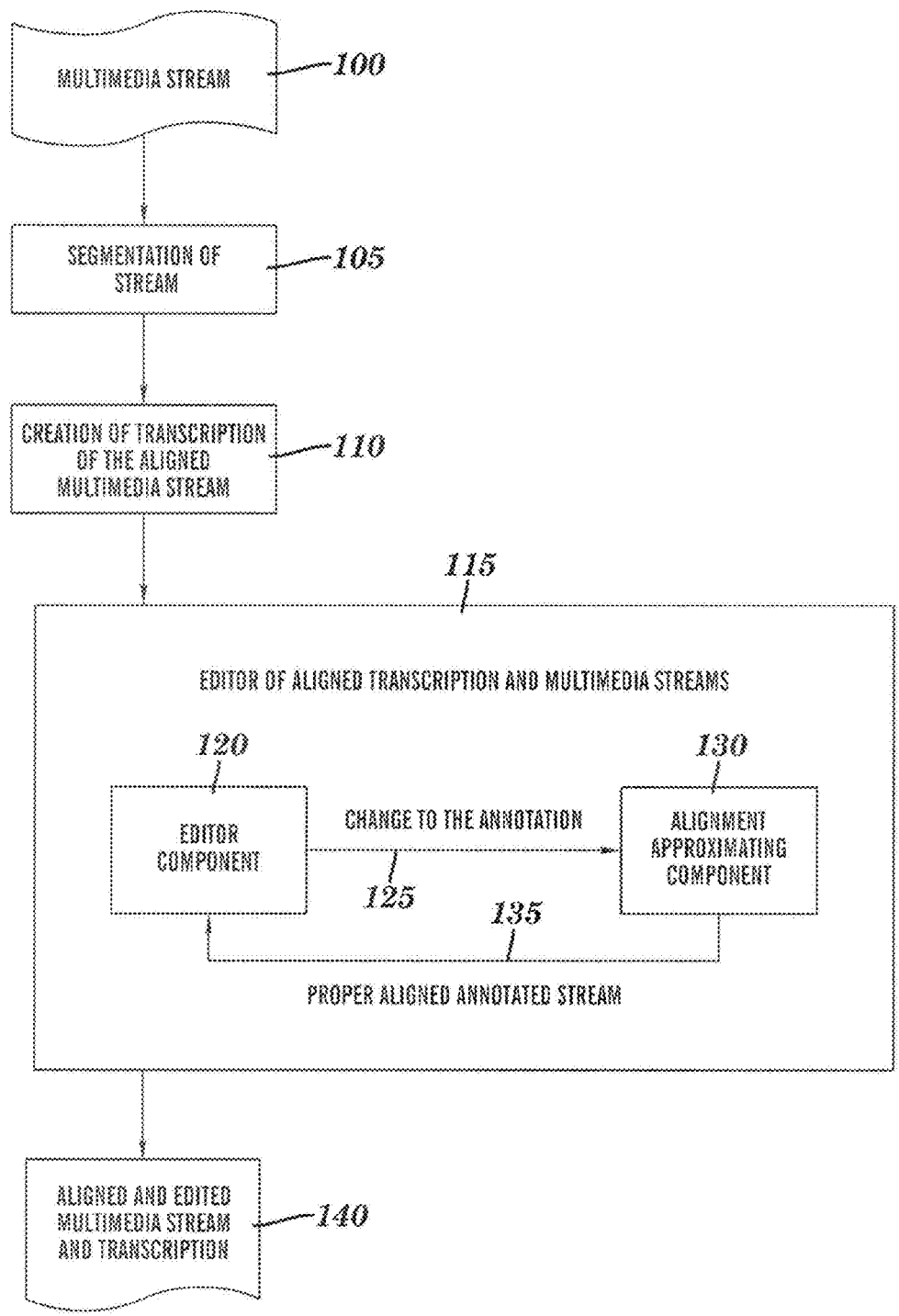
FIG. 1 illustrates one example of a diagram illustrating aspects of functional components that may be implemented within embodiments of the present invention.

The detailed description explains the preferred embodiments of the invention, together with advantages and features, by way of example with reference to the drawings.

DETAILED DESCRIPTION

One or more exemplary embodiments of the invention are described below in detail. The disclosed embodiments are intended to be illustrative only since numerous modifications and variations therein will be apparent to those of ordinary skill in the art.

Currently, many situations occur when it is necessary to create, and synchronize a transcription of a multimedia file (i.e., files containing audio and video data components) with the original multimedia file (e.g., transcripts or translations of video files, media databases, captions of television programs, etc. . . . ). ASR and automatic translation tools can be used to create initial draft transcriptions of a multimedia file. However, the transcription drafts that are generated by these tools more so than not will require the further editing of the transcription in order to provide the correct textual representation of the content that has been derived from the original multimedia file. A further, complication that may occur during the editing process of a transcription, is that the time alignment/synchronization that has been established between the multimedia files and a transcription media file is destroyed.

Thus, aspects of the present invention relate to the editing of transcription data that has been associated with a multimedia data file, while concurrently providing for the preservation of any annotated synchronization data that relates to the transcription data and a respective multimedia file. These aspects of the present invention are automatically accomplished, therefore allowing for the unrestricted editing of time aligned transcription data. And further, the preservation of any time alignment specifications is ensured between the transcription and multimedia data files, without placing any undue burden upon an editing system operator to manually maintain the time alignment annotation between a transcription data file and a multimedia data file. Aspects of the present invention additionally allow for the provision of additional feedback information to an editing system operator, wherein the feedback information is based upon timing information that is associated with edited text pronunciation, which in turn can be used to improve the annotation editing process.

The present invention is implemented within a computing system environment. The computer system can be a conventional personal computer. As is conventional, the computer can also include hardware and software elements conventionally included in personal computers, wherein the software elements of the programmed computer can comprise elements such as application specific windows, or browsers. The computer system has other hardware and software elements of the types conventionally included in personal computers, such as an operating system. Note, that software components implemented within embodiments of the present invention can be loaded into the computer via read/write storage devices or a network.

Turning now to the drawings in greater detail, it will be seen that in FIG. 1 there is a block diagram detailing aspects of an embodiment of the present invention. The methodologies of the present invention are initiated by the acquisition of a multimedia data stream file 100, wherein thereafter the multimedia data stream file is separated into its respective media data stream files 105 (i.e., an audio data stream and a video data stream). The respective data stream files that comprise the multimedia data stream are configured to comprise comprehensive time alignment data relating to the data streams, in addition to any annotated information that is associated with the data streams.

At block 110, a transcription of the audio data stream file is created from the audio data stream; wherein the transcription can be configured as a standard transcription of the audio data stream, a translation of the audio data stream, a listing of annotations that are associated with the audio data stream, or a summarization of the audio data stream. The transcription can be created using any conventionally available ASR conversion tool. The transcription comprises synchronization information that relates the textual elements of the transcription with the original multimedia data stream file from which the transcription was derived. In further aspects of the present invention, a transcriber can manually create a transcription, wherein the transcription can be created with, or without synchronization information that relates the timing of the transcription with the timing information of the original multimedia data stream file.

The transcription created at block 110 is input to an aligned transcription/multimedia stream editor 115. The aligned transcription/multimedia stream editor 115 comprises an editing software component 120, and an alignment-approximating component 130. The primary function of the editing component 120 is to perform any required transcription text and annotation editing operations. All editorial changes are reported to the alignment-approximating component 130, wherein the alignment-approximating component ensures that the annotated synchronization information relating to the edited transcription is properly aligned with the synchronization information that relates to the multimedia data stream information.

In further aspects of the present invention, software allowing very fine letter based segmentation, wherein the segmentation is based upon clearly aligned multimedia data to textual data. Further, interpolation that is based on approximation up to the letter level, is implemented in order to edit a transcription, or to add additional details to the annotation information for a transcription. For example, in the event that annotation information describing pitch or emotions, or annotation information that contains translation information for a transcription is necessitated, the existing alignment of the edited transcription and the multimedia data is kept intact. Software component 115 comprises the capability to respectively represent individual characters within a transcription, and annotated information that is associated with a respective character. Annotated information can include, but is not limited to character information, character timing information and character annotation information. In the event that one or more characters are to be inserted into the text of a transcription, then the final calculations in regard to the timing information that is associated with the inserted text is determined based upon on the timing information that is associated with the characters that surround/border the inserted text.

With aspects of the present invention, annotation information comprises structured timing information, wherein the timing information details how the general timing flow of the multimedia data would be affected by the insertion of the edited data. Structured timing data is currently defined as data that contains timing data for different multimedia data playback speeds (e.g., fast, slow, medium). The insertion of this time data into the overall processing flow relates to the use of contextual data in the determination of the overall speed of the audio/video media data at the editing point. Further, each time an editing operation is performed upon a transcription, the alignment-approximation for the edited transcription data to the multimedia data is recalculated.

In the event that it is determined that the quality of the transcription text, and the synchronization with the multimedia stream is sufficient, the annotated and/or transcribed multimedia stream information is outputted into a desired data format (e.g., an XML, HTML file or database).

Figure 2:
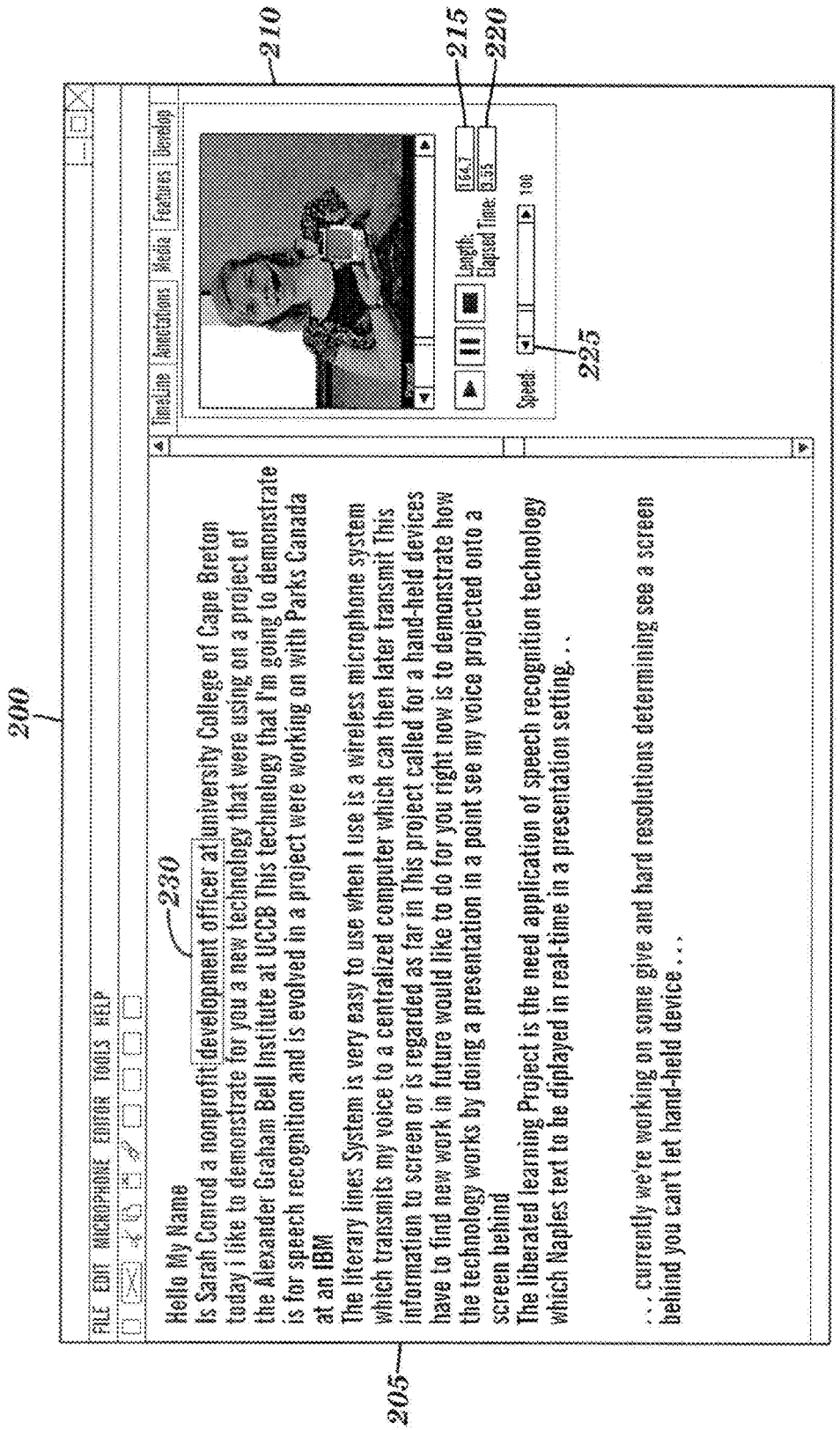
FIG. 2 illustrates one example of a GUI, wherein the GUI displays a screenshot of a window for an editable transcription stream, and a window for a multimedia file that is time-synchronized with the transcription stream.

Yet further aspects of the present invention allow for the provision of feedback to a system user based upon the timing information that is associated with the edited pronunciation of transcription text, which in its turn can also be used to improve the annotation editing process. FIG. 2 shows a screenshot of an editable transcription stream that is synchronized with a media data stream file. The screenshot shows a GUI 200, wherein the GUI 200 is used to display and edit time-aligned transcriptions. The left-side display 205, displays the text of a transcription. All of the textual character data of the transcription is associated with annotated timing information. The right-side display 210 is configured to playback a multimedia data file. The right-side display 210 further comprises multimedia controls, thus allowing for the control of the listening/viewing aspects of a multimedia data.

During a multimedia data playback operation, transcription text that is time associated with the multimedia data file is highlighted 230 at the left-side display. The highlighted text 230 is associated with the current playback time position 220 of the multimedia data. The playback speed of the multimedia data and the playback length of the multimedia data file are also respectively shown at 225 and 215. The present application further allows for the editing of a transcript in conjunction with the simultaneous listening and viewing of a multimedia data stream file. The timing information that is embedded into the transcription allows for the navigation from the edited text of the transcription to a relational playback position of the media file, and from the playback position of the media file to the text of the transcription during the editing process. A system user has only to select a character, word, or phrase in the text, and the multimedia file will travel to the corresponding synchronized point within the multimedia playback. Conversely, a user can select a multimedia data playback position, and the text that is synchronized with the playback position of the multimedia file will accordingly be highlighted.

Figure 3:
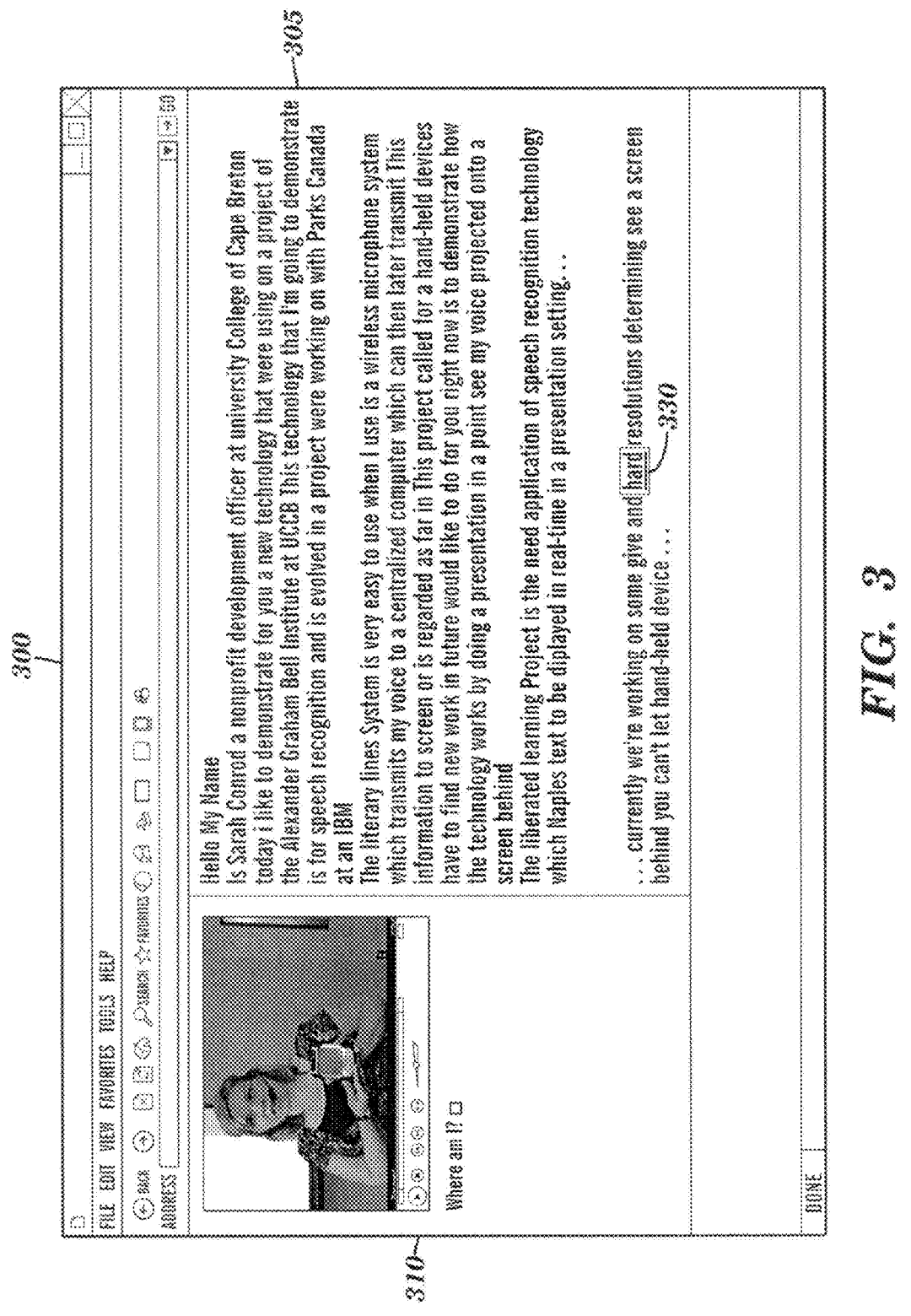

FIG. 3 shows outputted HTML formatted multimedia and transcription time-synchronized data streams. The screenshot of a browser 300 represents sample output data, demonstrating one of many benefits of having transcription text synchronized with a multimedia data stream file. In this example, the annotated timing information that is, embedded into the transcription text was used to generate an HTML (DHTML) application. The multimedia playback window 310 on the left side of the browser 300 is associated with the highlighted text 330 on the right side 305 to show the current text. As mentioned above, a system user also can click on any text on the right side 305 to make the playback of the multimedia data stream file travel to a corresponding position. Thus, an automatic generation of the HTML application is made possible due to the dynamic real-time editing of the transcription text data.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagram depicted herein is just an example. There may be many variations to the diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for editing timed and annotated data, comprising:
   acquiring a multimedia data stream;
   performing a decoding operation upon the multimedia data stream, wherein the decoded data stream comprises a textual data stream;
   synchronizing the multimedia data stream and the decoded data stream by performing a time stamping operation upon the data streams;
   editing the decoded data stream; and
   realigning the time stamp data of the edited decoded data stream in order to synchronize the edited decoded data with the multimedia data stream;
   wherein a predetermined interpolation technique is utilized to approximate a time annotation indicator associated with each letter that is edited within the textual data stream.

2. The method of claim 1, wherein the decoding operation comprises performing at least a transcription function, a translation function, an annotation function, or a summarization function upon the multimedia data stream.

3. The method of claim 1, further comprising utilizing an automatic editing process to edit the decoded data stream.

4. The method of claim 1, further comprising utilizing a manual editing process to edit the decoded data stream.

5. The method of claim 1, wherein the decoded data stream is configured to be edited by manual and automatic processes.

6. The method of claim 1, wherein the realigning of the decoded data stream with the multimedia stream further comprises calculating an average time length for the edited decoded data stream, a time length for respective edited data that is comprised within the edited decoded data stream, and the time length of the multimedia data stream.

* * * * *